(No Model.) A. SCHROEDER. 2 Sheets—Sheet 2.
FRICTION CLUTCH.
No. 442,260. Patented Dec. 9, 1890.
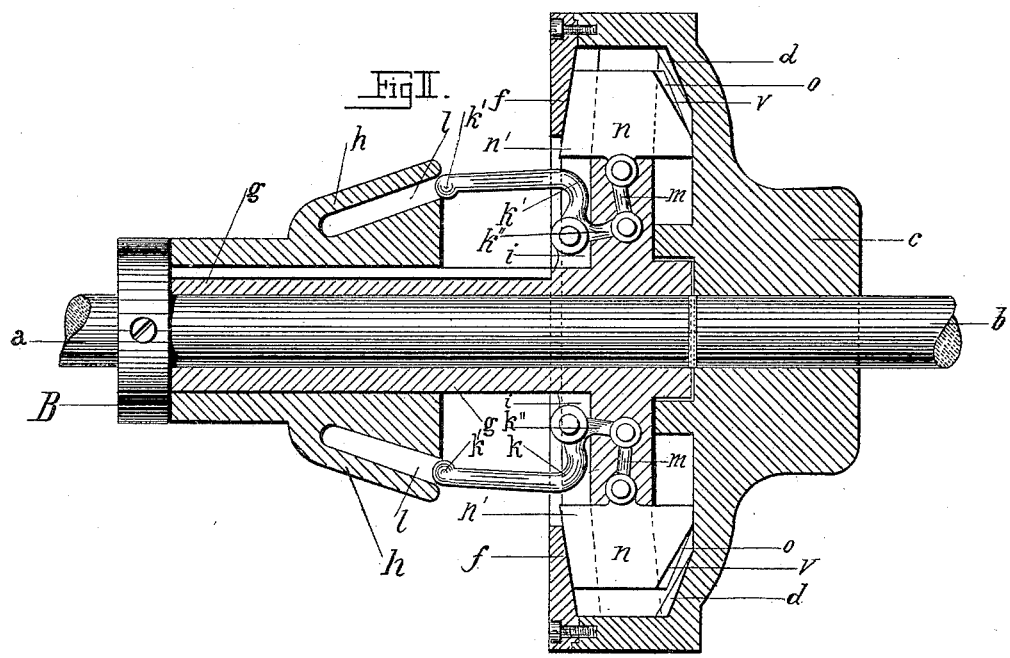
Witnesses:
James F. Duhamel.
Horace A. Dodge.
Inventor:
August Schroeder,
by Dodge Sons,
Attys.

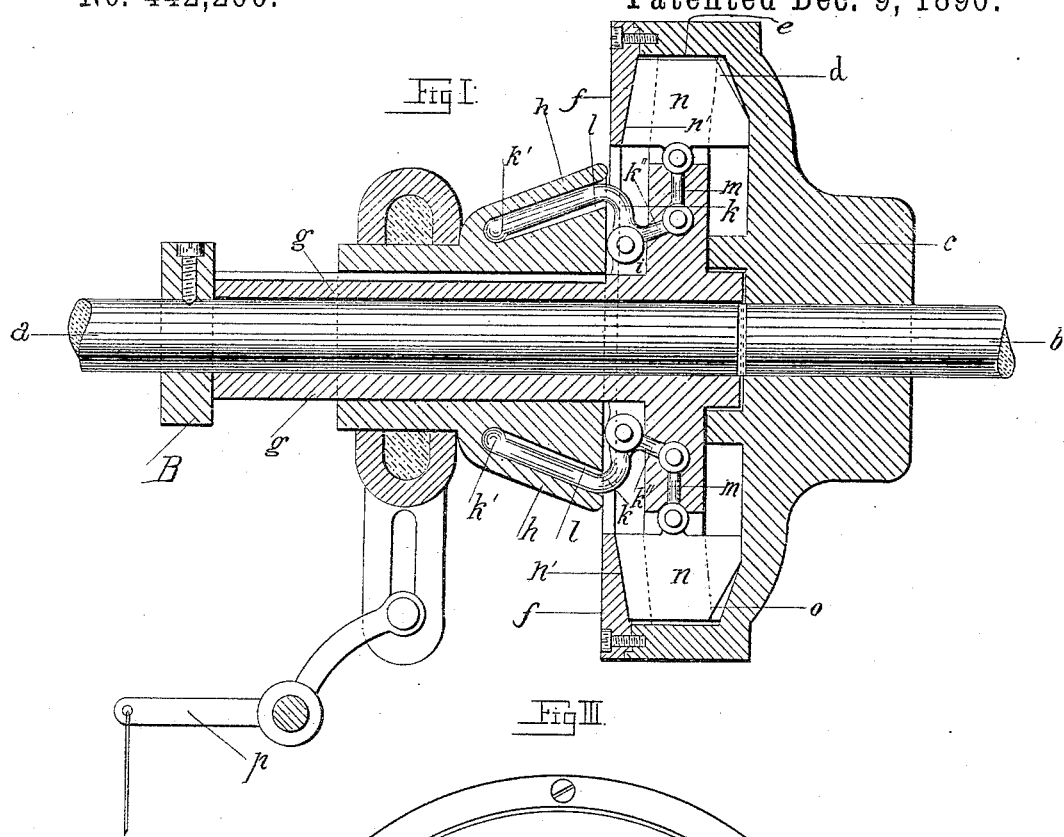
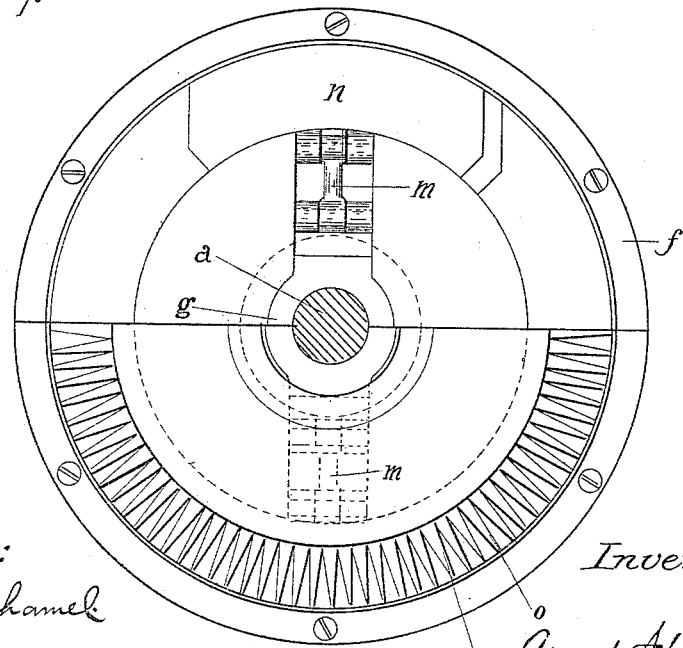

UNITED STATES PATENT OFFICE.

AUGUST SCHROEDER, OF RHEIDT, GERMANY.

FRICTION-CLUTCH.

SPECIFICATION forming part of Letters Patent No. 442,260, dated December 9, 1890.

Application filed September 8, 1890. Serial No. 364,389. (No model.)

*To all whom it may concern:*

Be it known that I, AUGUST SCHROEDER, engineer, of Rheidt, in the Kingdom of Prussia and German Empire, have invented new and useful Improvements in Friction-Clutches, of which the following is a specification, reference being had therein to the accompanying drawings.

The invention hereinafter described has reference to a friction-clutch for coupling shafting, pulleys, cog-wheels, &c.

The invention consists of a combined friction and toothed clutch by which first the friction-clutch and then the tooth-clutch is effected in such a manner that the engaging and disengaging of the parts which have to be coupled are perfectly free from any jar or shock.

The invention is illustrated on the annexed drawings, and may be described as follows.

Figure I shows the clutches as they are when coupled. Fig. II shows the clutches as they are when uncoupled, both shown in longitudinal section. Fig. III represents in one half a front exterior view of the clutch and in the other half an inner view showing the teeth-faces.

The invention has the following construction.

$a$ and $b$ are the shafts to be coupled.

$c$ is a face-plate keyed on the shaft $b$. The said face-plate $c$ is provided with a toothed inner rim $d$ and a plainly-turned cylindrical face $e$. To the front of the face-plate $c$ the ring $f$ is screwed on by set-screws, as illustrated.

On the shaft $a$ is mounted a bush $g$, upon which is fixed the clutch-box $h$ so that it may traverse in the direction of its length. The bush $g$ is furnished on its inner extremity, which lies inside the recess of the face-plate $c$, with two bearings $i\,i$, in which are mounted two specially-formed double-armed levers $k$. The ends of these double levers are furnished with spherical knobs $k'$, which fit into two converging recesses $l\,l$, formed in the clutch-box $h$, and to the other arms $k''$ of these same levers are connected links $m$, which at their other extremities are connected to the brake-blocks $n$. These brake-blocks $n$ are of such a width and so movable (in a somewhat inclined direction almost parallel with the face of the toothed rim) that they rub first on the inner face of the ring $f$ in moving outward and then engage with their rear toothed faces $o$ into the toothed rim $d$ of the face-plate $c$. By a suitable longitudinal traversing of the clutch-box $h$, effected by means of the lever $p$ and other suitable transferring parts, the clutch-box $h$ is moved to and fro upon the bush $g$. The recesses $l\,l$ being stationary in the clutch-box $h$, a movement of the brake-blocks in the radial direction is effected.

The action of this mechanism is as follows: In case the shafts $a$ and $b$ have to be coupled together, the ends $k'$ of the levers $k$, by the sliding of the clutch-box $h$ along the bush $g$, get pushed out of the position represented in Fig. 2 and brought into that illustrated in Fig. 1. The faces $k'$ of the brake-blocks are thus first brought into contact with the inner face of the ring $f$, and thus from the revolving face-plate $c$ first the brake-blocks $n$ and then the shaft $a$ are slowly turned. By further pushing of the brake-blocks into the hollow space between the face $e$ and the ring $f$ such brake-blocks $n$ are caused to engage with their teeth into the teeth $d$ of the face $e$, whereby a strong coupling-connection is effected between the face-plate $c$, the clutch-box $h$, and the shaft $a$. In the disengaging of this improved coupling the connection is first severed between the teeth $d$ and $o$, and then by further drawing back of the brake-blocks $n$ the connection is afterward severed between the friction-faces.

What I claim, and desire to secure by Letters Patent of the United States, is—

1. In combination with the shaft $b$, a face plate or hub $c$, provided with a toothed rim $d$ and a smooth face $e$, shaft $a$, carrying the brake-blocks $n$, and means substantially such as shown and described for moving said blocks radially into and out of engagement with smooth face $e$ and toothed rim $d$ of the plate or hub $c$.

2. In combination with the shaft $b$, the face plate or hub $c$, provided with toothed rim $d$, smooth face $e$, and ring $f$, shaft $a$, provided with bush $g$, levers carried by the bush, blocks $n$, connected with the inner ends of the levers and adapted to engage the face-plate, substantially as shown, and a sliding block $h$, adapted to actuate the levers.

3. In a combined friction and toothed clutch, the combination, with a shaft, of a hub or plate $c$, provided with a friction-face and a series of radial teeth, a shaft $a$, brake-blocks $n$, moving radially or in the direction of the length of the teeth, and means for moving the blocks.

Rheidt, the 17th day of June, 1890.

AUGUST SCHROEDER.

Witnesses:
PAUL FISCHER,
BERNH. DIETZE.